(12) United States Patent
Wu

(10) Patent No.: US 9,086,916 B2
(45) Date of Patent: Jul. 21, 2015

(54) ARCHITECTURE FOR EFFICIENT COMPUTATION OF HETEROGENEOUS WORKLOADS

(71) Applicant: Advanced Micro Devices, Inc., Sunnyvale, CA (US)

(72) Inventor: Winthrop J. Wu, Shrewsbury, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 148 days.

(21) Appl. No.: 13/894,990

(22) Filed: May 15, 2013

(65) Prior Publication Data

US 2014/0344826 A1 Nov. 20, 2014

(51) Int. Cl.
*G06T 1/20* (2006.01)
*G06F 9/38* (2006.01)
*G06F 9/48* (2006.01)

(52) U.S. Cl.
CPC ............ *G06F 9/4843* (2013.01); *G06F 9/3877* (2013.01); *G06F 9/4881* (2013.01); *G06T 1/20* (2013.01)

(58) Field of Classification Search
None
See application file for complete search history.

(56) References Cited

U.S. PATENT DOCUMENTS 6,940,515 B1 * 9/2005 Moreton et al. .............. 345/522
2009/0027383 A1 * 1/2009 Bakalash et al. .............. 345/419

* cited by examiner

*Primary Examiner* — Qing Wu
(74) *Attorney, Agent, or Firm* — Liang & Cheng, PC

(57) ABSTRACT

Embodiments of a workload management architecture may include an input configured to receive workload data for a plurality of commands, a DMA block configured to divide the workload data for each command of the plurality of commands into a plurality of job packets, a job packet manager configured to assign one of the plurality of job packets to one of a plurality of fixed function engines (FFEs) coupled with the job packet manager, where each of the plurality of FFEs is configured to receive one or more of the plurality of job packets and generate one or more output packets based on the workload data in the received one or more job packets.

20 Claims, 17 Drawing Sheets

ARCHITECTURE FOR EFFICIENT COMPUTATION OF HETEROGENEOUS WORKLOADS

TECHNICAL FIELD

This disclosure relates to the field of workload management and, in particular, to an architecture for management of heterogeneous workloads.

BACKGROUND

In addition to a central processing unit (CPU), a computer system may in some cases utilize a coprocessor for performing additional functions. For example, a coprocessor may be used to perform such operations as floating point arithmetic, graphics operations, signal processing, string processing, encryption, compression, and interfacing with peripheral devices. Coprocessors may thus be optimized for performing specific types of calculations efficiently, and may increase overall system performance by offloading processor-intensive tasks from the CPU.

A coprocessor may be used to process a heterogeneous workload that may include several different types of computations, each having its own unique set of computational requirements, such as data size or processing time. A typical architecture may execute such heterogeneous workloads by relying on software management to execute multiple workloads sequentially using a single or multiple hardware engines. However, the different computational requirements presented by a heterogeneous workload may make it difficult to execute using such a system; different computational (data) sizes or computational time may add significant complexity as compared to homogeneous workloads.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the spirit and scope of the embodiments.

One embodiment of an architecture for managing a heterogeneous workload that presents multiple data streams for computation may allow such multiple data streams to be processed concurrently without external supervision by a processor or host system. Specifically, the data streams may be processed by functions executing concurrently on multiple hardware engines. In one embodiment, the hardware engines may be fixed-function engines (FFEs) that are optimized for performing specific functions or sets of calculations.

For example, a heterogeneous workload may include commands to process data using the following cryptographic methods, which vary widely in terms of data size and computation time: AES-128 encryption, which processes 128-bits every 11 clock cycles; SHA-1, which processes 512-bits every 80 cycles; RSA-2048, which processes 2048-bits every 4,236,1024 cycles; and Zlib decompression, which processes 8-bits per clock cycle. Aside from cryptographic functions, other heterogeneous workloads may include commands to perform various floating point arithmetic, graphics, signal processing, string processing, or compression functions, for example, which may also vary in terms of data size, computational time, or other factors.

In order to effectively manage a heterogeneous workload, an embodiment of a workload management architecture may decompose the workload into a stream of computational units known as job packets, and schedule the job packets to be processed independently. In one embodiment, the architecture may be capable of managing either homogeneous workloads, heterogeneous workloads, or any hybrid combination including both homogeneous and heterogeneous workloads.

Figure 1:
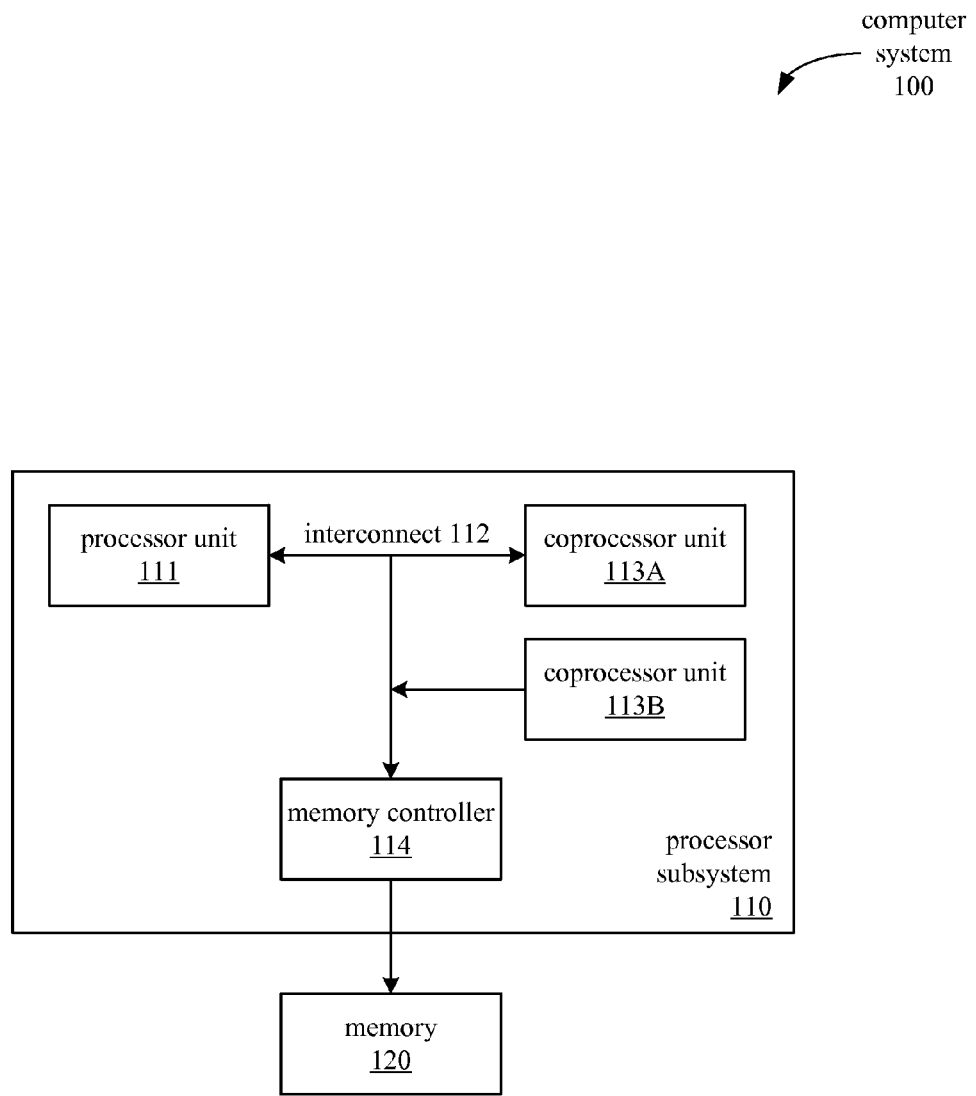
FIG. 1 illustrates an embodiment of a computer system.

FIG. 1 illustrates an embodiment of a computer system 100 which may implement a workload management architecture. Computer system 100 may include a processor subsystem 110 coupled with memory 120. Computer system 100 may be any of various types of devices, including, but not limited to, a personal computer system, desktop computer, laptop or notebook computer, mainframe computer system, handheld computer, workstation, network computer, a consumer device such as a mobile phone, pager, or personal data assistant (PDA). Computer system 100 may also be any type of networked peripheral device such as storage devices, switches, modems, routers, etc. Although a single computer system 100 is shown in FIG. 1 for convenience, system 100 may also be implemented as two or more computer systems operating together.

In one embodiment, processor subsystem 110 may include one or more processors or processing units. For example, processor subsystem 110 may include one or more processor units, such as processor unit 111, that are coupled to one or more coprocessor units (e.g., coprocessor units 113A and 113B). In various embodiments, processor subsystem 110 (or each processor unit within 110) may contain a cache or other form of on-board memory.

Memory 120 is coupled with processor subsystem 110 and is usable by processor subsystem 110. Memory 120 may be implemented using different physical memory media, such as hard disk storage, floppy disk storage, removable disk storage, flash memory, random access memory (RAM-SRAM, EDO RAM, SDRAM, DDR SDRAM, etc.), read-only memory (PROM, EEPROM, etc.), and so on. In one embodiment, the available memory in computer system 100 is not limited to memory 120. Rather, computer system 100 may be said to have a "memory subsystem" that includes various types/locations of memory. For example, the memory subsystem of computer system 100 may, in one embodiment, include memory 120, cache memory in processor subsystem 110, and storage on various I/O devices (e.g., a hard drive, storage array, etc.). Thus, the phrase "memory subsystem" may represent various types of possible memory media that can be accessed by computer system 100. In some embodiments, the memory subsystem stores program instructions executable by processor subsystem 110.

Processor subsystem 110 includes a processor unit 111, coprocessor units 113A and 113B, and a memory controller 114, all coupled together via an interconnect 112 (e.g., a point-to-point or shared bus circuit). In one embodiment, processor unit 111 and coprocessor units 113A and 113B may be located on the same die. In an alternative embodiment, processor unit 111 and coprocessor units 113A and 113B may be located on separate dies. In one embodiment, coprocessor unit 113B and memory controller 114 may be omitted from the processor subsystem 110. For example, processor unit 111 may be coupled only to a single coprocessor unit (e.g., 113A); alternatively, processor unit 111 may be coupled to multiple coprocessor units (e.g., 113A and 113B). Additional coprocessor units may be possible in other embodiments. In various embodiments, processor unit 111 and coprocessor units 113A and 113B may share a common memory controller 114. Memory controller 114 may be configured, for example, to access a main system memory (e.g., memory 120). In other embodiments, each processor unit 111 and coprocessor units 113A and 113B may be coupled to respective memory controllers.

In one embodiment, processor unit 111 is a general-purpose processor unit (e.g., a central processing unit (CPU)) that may include one or more execution units. Alternatively, unit 111 may be a special-purpose processor such as a graphics processor. In one embodiment, processor unit 111 may be configured to execute instructions fetched from memory 120 using memory controller 114. The architecture of unit 111 may have various features; for example, it may be pipelined. In other embodiments, processor unit 111 may implement a multithreaded architecture for simultaneously executing multiple threads. Processor unit 111 may execute, without limitation, application-specific instructions as well as operating system instructions. These instructions may allow the implementation of any number of features, including, as just one example, virtual memory.

In one embodiment, processor unit 111 may be coupled as a companion processor to one or more coprocessor units 113A and 113B, permitting unit 111 to provide instructions to coprocessor units 113A and 113B. Instructions provided by processor unit 111 to coprocessor units 113A and 113B may be within a common instruction stream (i.e., unit 111 fetches instructions to execute and provides certain of those fetched instructions to unit 113A and 113B for execution). Certain instructions provided from processor unit 111 to coprocessor unit(s) 113A and 113B may be "control" instructions generated by a functional unit within processor unit 111 to control the operation of coprocessor unit(s) 113A and 113B.

In one embodiment, coprocessor units 113A and 113B may be used to help perform the work of processor unit 111. As with processor unit 111, coprocessor units 113A and 113B are not limited to any particular function or architecture. In various embodiments, coprocessor units 113A and 113B may be general-purpose or special-purpose processors (e.g., graphics processor units (GPU), video decoding processors, encryption processors, queue managers, etc.). In one embodiment, coprocessor units 113A and 113B may be implemented as a field-programmable gate array (FPGA). In some embodiments, coprocessor units 113A and 113B may be pipelined. Coprocessor units 113A and 113B may, in some embodiments, employ a multithreaded architecture. In various embodiments, coprocessor units 113A and 113B may be configured to execute microcode instructions in order to perform certain instructions received from unit 111. In certain embodiments, coprocessor units 113A and 113B may support the use of virtual memory.

In one embodiment, interconnect 112 may be a shared bus circuit that couples processor unit 111 to coprocessor units 113A and 113B. In one embodiment, interconnect 112 may implement a "virtual tunnel" that allows processor unit 111 to communicate with coprocessor units 113A and 113B via a packet-based protocol such as Hyper Transport or PCI-Express. In some embodiments, interconnect 112 may be a front-side bus. In one embodiment, coprocessor units 113A and 113B may be coupled to processor unit 111 through a Northbridge-type device.

In one embodiment, memory controller 114 is configured to provide an interface for processor unit 111 and/or coprocessor units 113A and 113B to access memory (e.g., memory 120). Memory controller 114 may be used, for example, to fetch instructions or to load and store data. In one embodiment, processor unit 111 may use memory controller 114 to fetch instructions for execution in processor unit 111 or coprocessor units 113A and 113B. In another embodiment, a coprocessor unit 113A or 113B may use memory controller 114 to fetch its own instructions or data.

Figure 2:
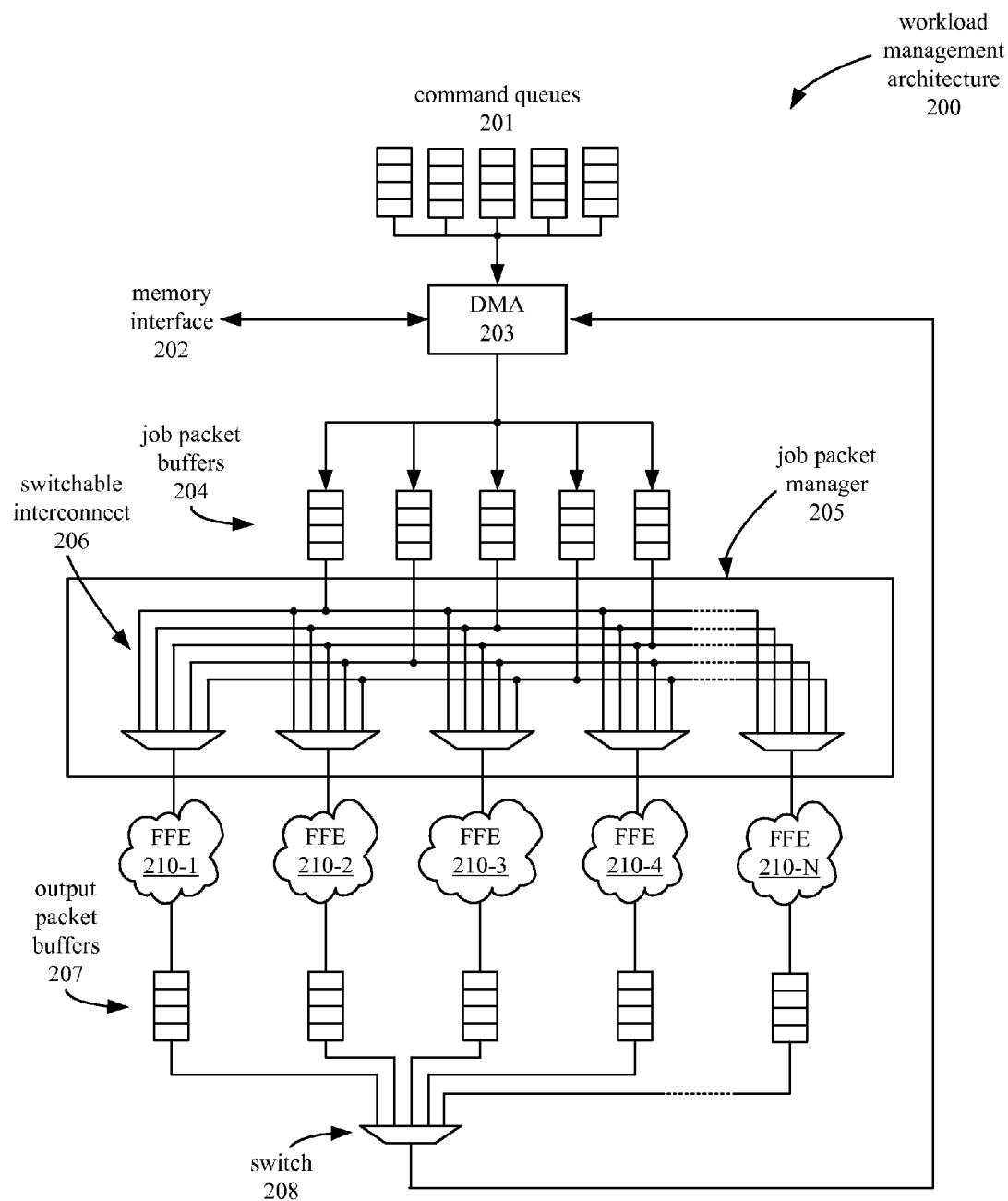
FIG. 2 illustrates an embodiment of a workload management architecture.

FIG. 2 illustrates a workload management architecture 200, according to an embodiment, which may be implemented in a coprocessor such as coprocessor unit 113A or 113B. In alternative embodiments, the workload management architecture 200 is not limited to coprocessor implementations, and may be implemented in other types of processors or devices; for example, the architecture 200 may be implemented in a processor unit such as processor unit 111 in a processor subsystem 110 that may or may not include coprocessor units 113A and 113B. In one embodiment, the workload management architecture may be implemented in a single block of a single integrated circuit chip.

In one embodiment, the architecture 200 may include a set of command queues 201, which are coupled with an input of a direct memory access (DMA) block 203. In one embodiment, the DMA block 203 may be further coupled with a number of job packet buffers 204, which are in turn coupled with a job packet manager 205. The job packet manager 205 may be coupled with each of a set of N fixed-function engines (FFEs) 210-1 to 210-N. Each of the FFEs may have an output connected to a corresponding output packet buffer 207. Each of the output packet buffers 207 is connected via a switch 208 to the DMA block 203. In one embodiment, the components of workload management architecture 200 may be constructed on the same semiconductor substrate. For example, the components, including the DMA block 203, the job packet manager 205, the FFEs 210, and other components may be constructed as part of a coprocessor on a single semiconductor chip.

In one embodiment, each of the command queues 201 is a data structure (such as a linked list, stack, table, etc.) or other memory that can be used to contain control information and data associated with one or more commands in a single workload. In one embodiment, a workload may reside in one and only one of the command queues 201 at a given time. Thus, with n command queues 201, the architecture 200 may support n simultaneous workloads. Each of the n workloads may be heterogeneous, homogeneous, or a combination of both heterogeneous and homogeneous workloads. In one embodiment, the command queues 201 may be implemented as first-in-first-out (FIFO) buffers.

In one embodiment, the DMA block 203 performs the fragmentation of the workload data into a stream of job packets and reassembling the resulting output stream in memory (via memory interface 202) after the job packets have been processed. In one embodiment, the command queues 201 may be coupled to the DMA block 203 such that the DMA block 203 can receive the workload data and control information from the command queues 201. The DMA block 203 may be configured to, in response to receiving the workload commands and workload data from the command queues 201, divide the workload data for each of the received commands into a number of job packets. In order to create a stream of job packets for a workload, the DMA may fetch and segment the input workload data, retrieve the control information for the workload, and combine these together into a job packet according to the specifications of specified FFEs which are to be used for processing the job packets.

In one embodiment, each of the commands in the workload may be associated with a particular FFE; for example, the command may indicate an FFE to be used for processing the workload data associated with the command. In one embodiment, the DMA block 203 may identify the particular FFE associated with the command based on control information, workload data, or some other indication. In response to identifying the FFE that is to process the data associated with the command, the DMA block 203 may then determine how to arrange the workload data and control information into a job packet according to a format that can be processed by the FFE.

For example, a job packet destined for an FFE that is configured to perform AES encryption may include a set of input data, an AES key, and a flag indicating whether encryption or decryption is to be performed by the FFE. The DMA block 203 may also add metadata to the job packet; for example, the job packet may include a header containing flags indicating whether the job packet is the first or last job packet of a command, or containing fields indicating the length of the data payload of the job packet.

In one embodiment, the DMA block 203 may also add a command queue identification (ID) tag to each job packet of a command identifying the command or the command queue from which the job packet originated. Such tagging may facilitate the processing of workstreams that include multiple commands.

In one embodiment, the DMA block 203 generates a series of job packets and stores the job packets in one or more job packet buffers 204. In one embodiment, the buffers 204 may be implemented using FIFO buffers.

In one embodiment, the workload management architecture 200 may also include a job packet manager 205 coupled with the job packet buffers 204. The job packet manager 205 may be configured to assign one or more of the job packets produced by the DMA block 203 and stored in the buffers 204 to one of the FFEs 210. Based on the assignment, the job packet manager 205 may retrieve job packets from the buffers 204 and transmit the job packets to the appropriate one of the FFEs 210 that is coupled with the job packet manager 205.

In one embodiment, the job packet manager 205 may transfer job packets via a switchable interconnect 206 that is coupled with the DMA block 203 directly or through buffers 204. The switchable interconnect 206 may thus couple the DMA block 203 to each of the FFEs 210, so that the job packets produced by the DMA block 203 can be distributed to the different FFEs 210. In one embodiment, the switchable interconnect 206 may be implemented as a cross-bar network.

In one embodiment, when one of the FFEs 210 has available space to accept a new job packet, the job packet manager 205 may arbitrate between the job packets queued in the buffers 204 to identify a job packet to send to the FFE. In one embodiment, priorities may be assigned to the commands in the workstream, the command queues, or to specific job packets to control the allocation of the FFEs' computational bandwidth when conflicts arise.

In one embodiment, when one of the command queues 201 has run out of data (underflowed) then the command queue may stall until more data has been stored in the command queue, and a job packet created from that data. The DMA block 203 may ignore the underflowed command queue and only arbitrate between command queues that have work packets ready to queue. In one embodiment, allocation of the FFEs' computational bandwidth may be performed on an arbitration cycle basis and may be based upon the priorities of just the command queues having job packets ready to be distributed to the FFEs 210.

Accordingly, each of the FFEs 210 may be configured to receive one or more of the job packets and generate one or more output packets based on the workload data in the received one or more job packets. For example, a FFE may receive a job packet, then perform a function on the workload data in the packet, in accord with control information or function parameters also contained within the job packet. The FFE may then generate an output packet containing the output data resulting from performing the function. In one embodiment, an FFE may generate one output packet for each job packet that is processed by the FFE.

In one embodiment, each of the FFEs 210 may include an input FIFO buffer for queuing job packets that have been assigned to the corresponding FFE. Thus, each input FIFO buffer queues job packets for a different one of the FFEs 210. In order to process a job packet, an FFE may receive the job packet in its input FIFO buffer, and may then process the job packet after processing any preceding job packets in the input FIFO buffer. In one embodiment, each FFE processes a single job packet at a time; however, the multiple FFEs 210 may process job packets in parallel.

In one embodiment, each of the FFEs 210 may include an arrangement of logic gates, memory cells, and/or other devices arranged to perform a specific calculation or function using the input data and other information in the job packets. Alternatively, the functions of the FFEs 210 may be implemented using software or firmware that is executed using a processor.

In one embodiment, each of the FFEs 210 may be configured to perform a different set of calculations from any of the other FFEs. For example, a first FFE 210-1 may perform a first set of calculations for AES encryption while a second FFE 210-2 performs a different set of calculations to implement SHA encryption. Alternatively, some of the FFEs 210 may be redundant, such that two or more of the FFEs 210 perform the same or similar function, or perform the same or similar sets of calculations.

In one embodiment, the time durations taken by each of the FFEs 210 to finish processing a job packet may vary. For example, FFE 210-1 may take less time to process a job packet than FFE 210-2.

In one embodiment, when processing job packets, each FFE may identify ordering information in the job packets and copy the ordering information into the corresponding output packets generated by the FFE. In one embodiment, the ordering information indicates the original order of the job packets, and further indicates an order in which the output data in the output packets is to be arranged when assembling the output data stream.

In one embodiment where the DMA block 203 has added to each job packet a command queue ID tag identifying the command queue from which the job packet originated, each FFE may be further configured to copy the tag from the job packet to its corresponding output packet. In one embodiment, the FFE copies the tag into the output packet when the FFE queues the output packet in one of the output packet buffers 207.

In one embodiment, each of the FFEs 210 may be coupled with one of a set of output packet buffers 207. Each of the output packet buffers 207 may be configured to receive the output packets generated by the FFEs 210 and queue the output packets prior to assembly into an output data stream. In one embodiment, the switch 208 may be used to selectively couple one of the output packet buffers 207 to the DMA block 203 so that the DMA block 203 can retrieve one or more output packets from the selected output packet buffer.

In one embodiment, the DMA block 203 may assemble the output data from the received output packets into an output data stream. In one embodiment, the DMA block 203 uses the command queue ID tag to identify output packets belonging to a particular command queue and to combine those packets together into an output buffer for the specified command queue.

The output packets may be assembled in an order indicated by the ordering information in one or more of the output packets. In one embodiment, the output data stream may include the payload data from the output data packets while excluding some or all of the metadata contained in the output data packets.

In one embodiment, the output data stream may be stored in memory by the DMA via memory interface 202. For example, the output data may be stored in memory 120, illustrated in FIG. 1.

Figure 3:
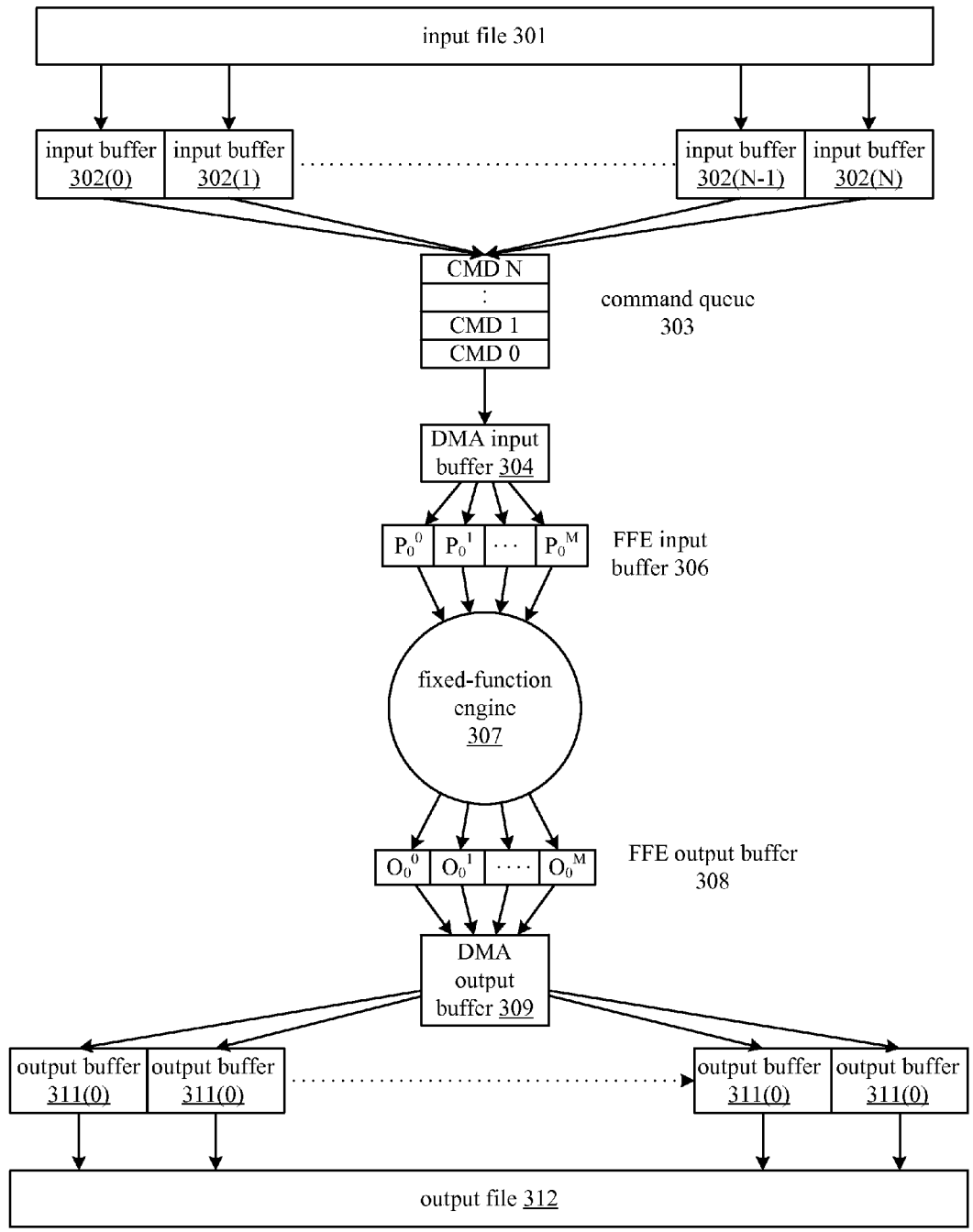
FIG. 3 is a diagram illustrating a workstream, according to one embodiment.

FIG. 3 illustrates the handling of a single workstream by a workload management architecture such as architecture 200. In one embodiment, the workload data may initially be stored as an input file 301 in memory. The data in the input file 301 is stored into one or more input buffers 302.

In one embodiment, a command for each of the input buffers 302 may be submitted to a command queue 303. The command queue 303 may be similar to one of the command queues 201 illustrated in FIG. 2, for example. From the command queue 303, the workload data may be transferred to the DMA input buffer 304, which may be coupled at the input of a DMA block such as DMA block 203. The DMA block thus reads the workload data in the input buffer 304 that is associated with a particular command and segments the workload data into a series of job packets $P_0^0$-$P_0^M$.

In one embodiment, the DMA block may scan periodically for free space in the input FIFO buffer for each FFE in a set of FFEs, such as FFEs 210. In response to determining that space is available in an input FIFO buffer 306 of an FFE 307, the DMA block may initiate an arbitration cycle for the FFE 307. During the arbitration cycle the DMA block may scan each command queue, including command queue 303, to arbitrate between workstreams that target the available FFE 307 and have a job packet ready for queuing at the FFE 307.

In one embodiment, the job packet manager 205 may perform n arbitration cycles for each of the n FFEs in parallel. In one embodiment, the command in the command queue may indicate which of the FFEs is being targeted, thus indicating in which of the parallel arbitration cycles the command is to be considered. In alternative embodiment, the arbitration cycles may be performed serially.

In one embodiment, the workstream with the highest priority is selected and its job packet is queued in the input FIFO buffer 306 of the available FFE 307. For example, if the workstream in command queue 303 is identified as having the highest priority, job packets $P_0^0$-$P_0^M$ for the workstream are selected and transmitted to input FIFO buffer 306. The arbitration process repeats whenever space exists in any of the input FIFOs of the FFEs. The job packets that are placed in the input FIFO buffer 306 are serviced in order by the FFE 307.

In one embodiment, the FFE 307 generates an output packet for each of the job packets $P_0^0$-$P_0^M$ by performing some function, such as a set of calculations, based on information in the job packets $P_0^0$-$P_0^M$. The resulting output packets $O_0^0$-$O_0^M$ may be stored in the FFE's output FIFO buffer 308. In one embodiment, the output buffer 308 is similar to one of the output buffers 207 illustrated in FIG. 2, for example.

In one embodiment, the output packets $O_0^0$-$O_0^M$ are transferred to an output buffer 309 of the DMA block where data from the output packets $O_0^0$-$O_0^M$ are arranged in an order corresponding to the original order of the job packets $P_0^0$-$P_0^M$ from which the output packets $O_0^0$-$O_0^M$ were generated. The DMA block may then transfer the assembled data from the DMA output buffer 309 to output buffers 311. From the output buffers 311, the data can be written back to memory as an output file 312.

Figure 4:
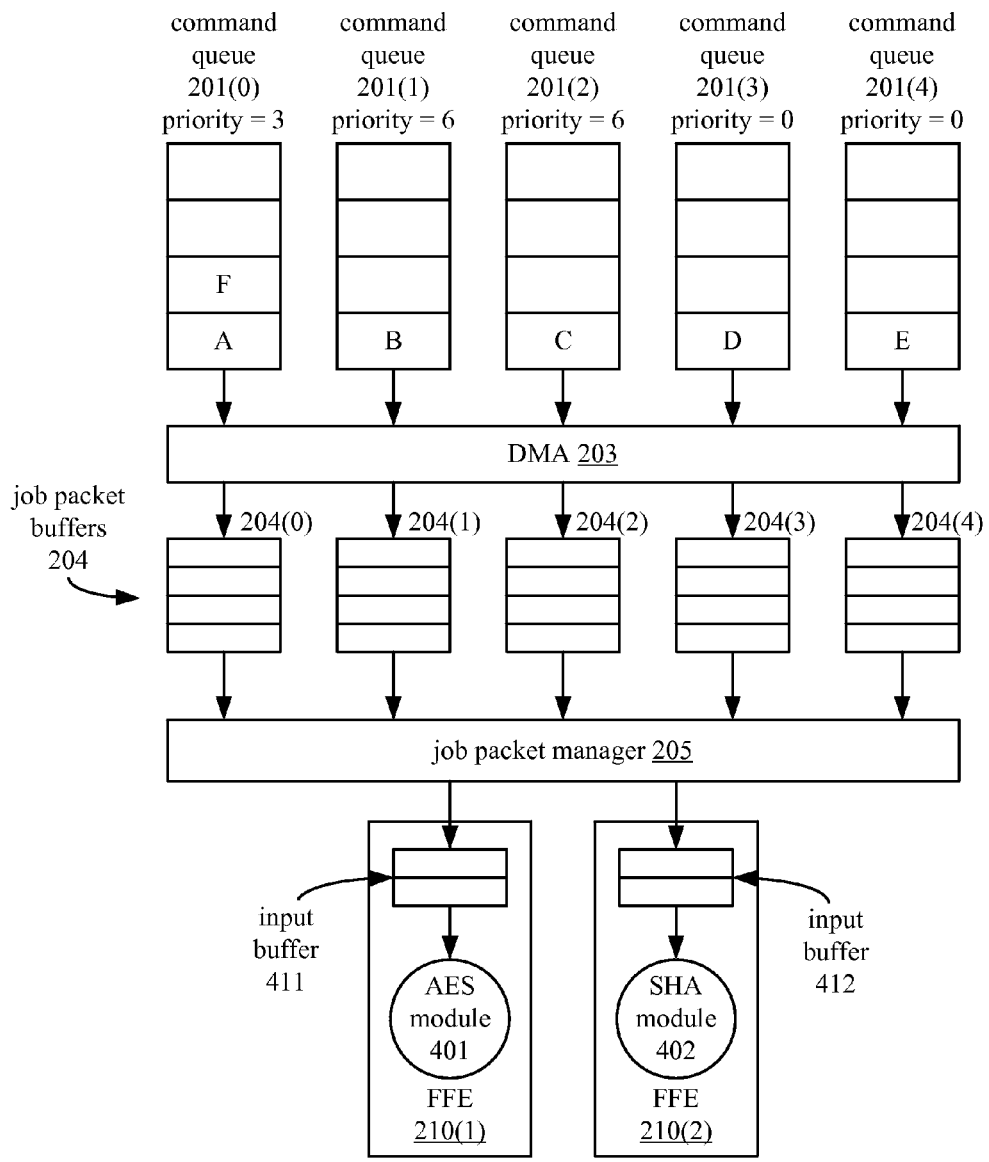
FIGS. 4-16 illustrate an example of a workload management process, according to an embodiment.

FIGS. 4-16 illustrate a workflow management process, according to an embodiment, in which the following six commands are submitted: command A, a 4 block AES job; command B, a 2 block AES job; command C, a 2 block AES job; command D, a 1 block AES job; command E, a 1 block AES job; and command F, a 1 block SHA job. As illustrated in FIG. 4, these commands are initially stored in command queues 201, with commands A and F being stored in command queue 201(0) and commands B, C, D, and E being stored in command queues 201(1), 201(2), 201(3), and 201(4), respectively. Command queues 201(0), 201(2), 201(3), and 201(4) have priorities of 3, 6, 6, 0, and 0, respectively.

Figure 5:
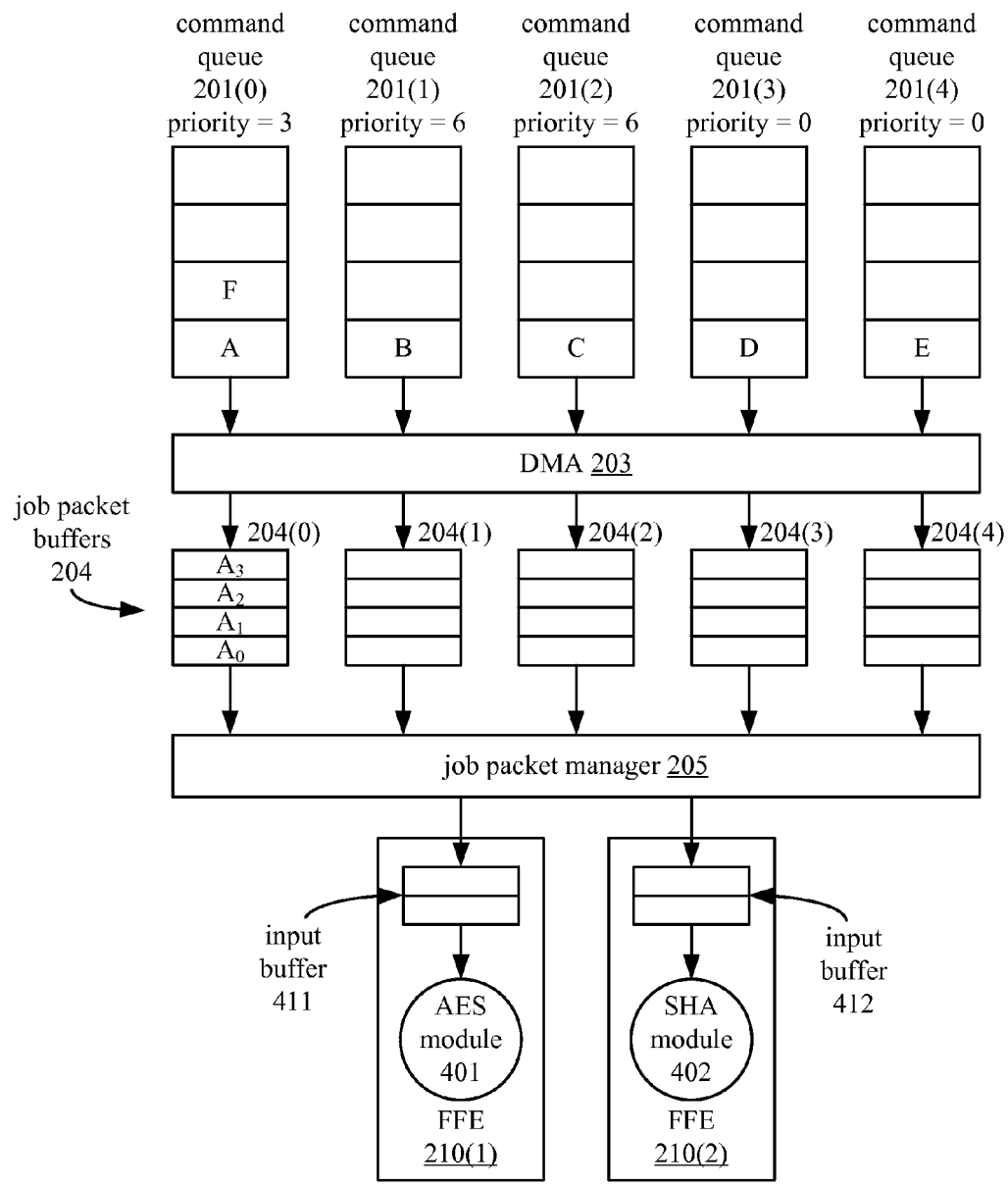

As illustrated in FIG. 5, the DMA block 203 begins retrieving the workload data associated with the commands in each of the command queues 201 and placing the data into the appropriate one of the job packet buffers 204(0)-204(4). Specifically, the DMA block 203 begins by dividing the workload data associated with command A into job packets $A_0, A_1, A_2,$ and $A_3$ which are stored in job packet buffer 204(0) corresponding to command queue 201(0).

Figure 6:
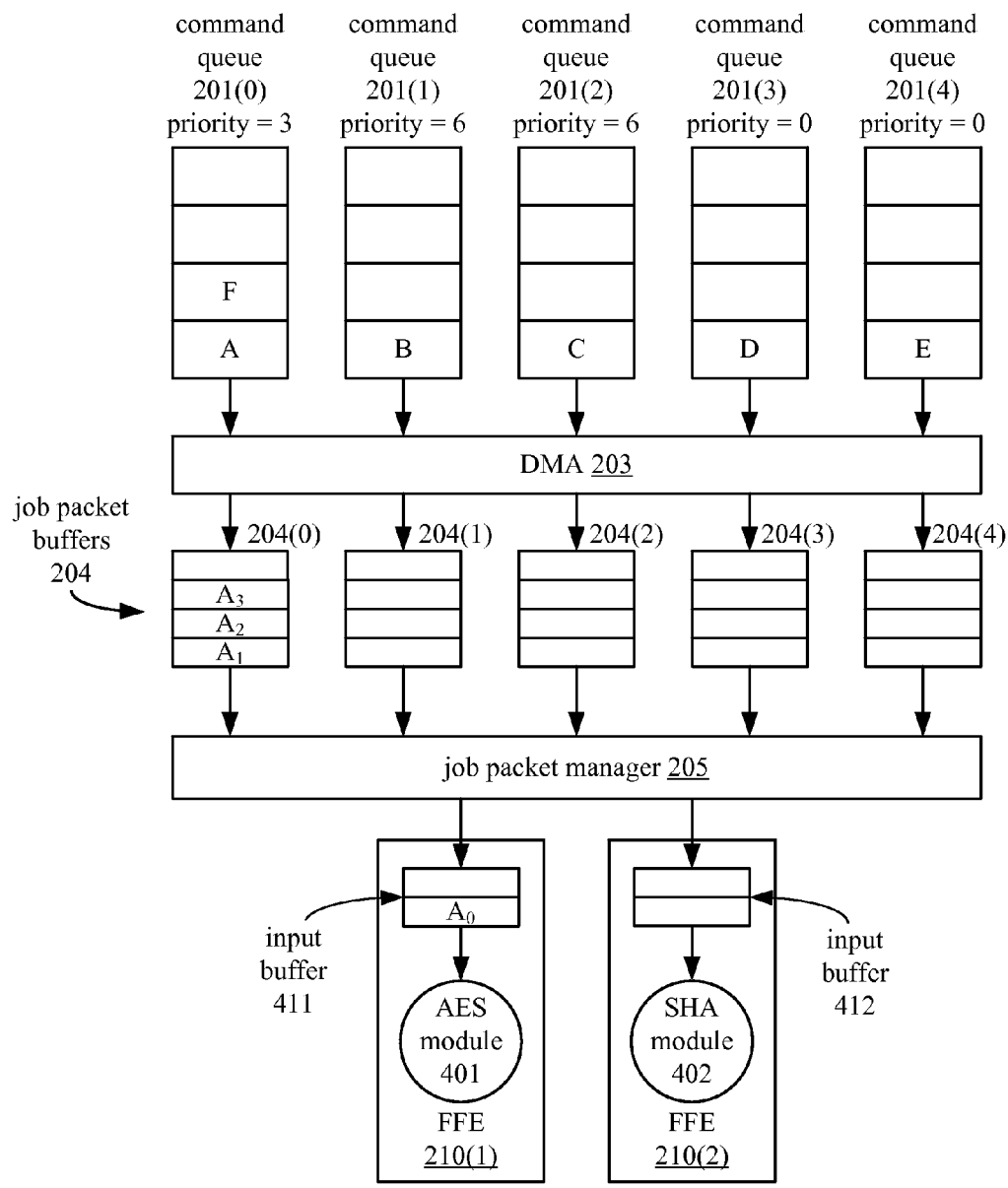

As illustrated in FIG. 6, since command A has at least 1 block of AES data available, the job packet manager 205 queues $A_0$ in the input buffer 411 for FFE 210(1), which includes an AES module 401, which is configured to perform AES encryption.

Figure 7:
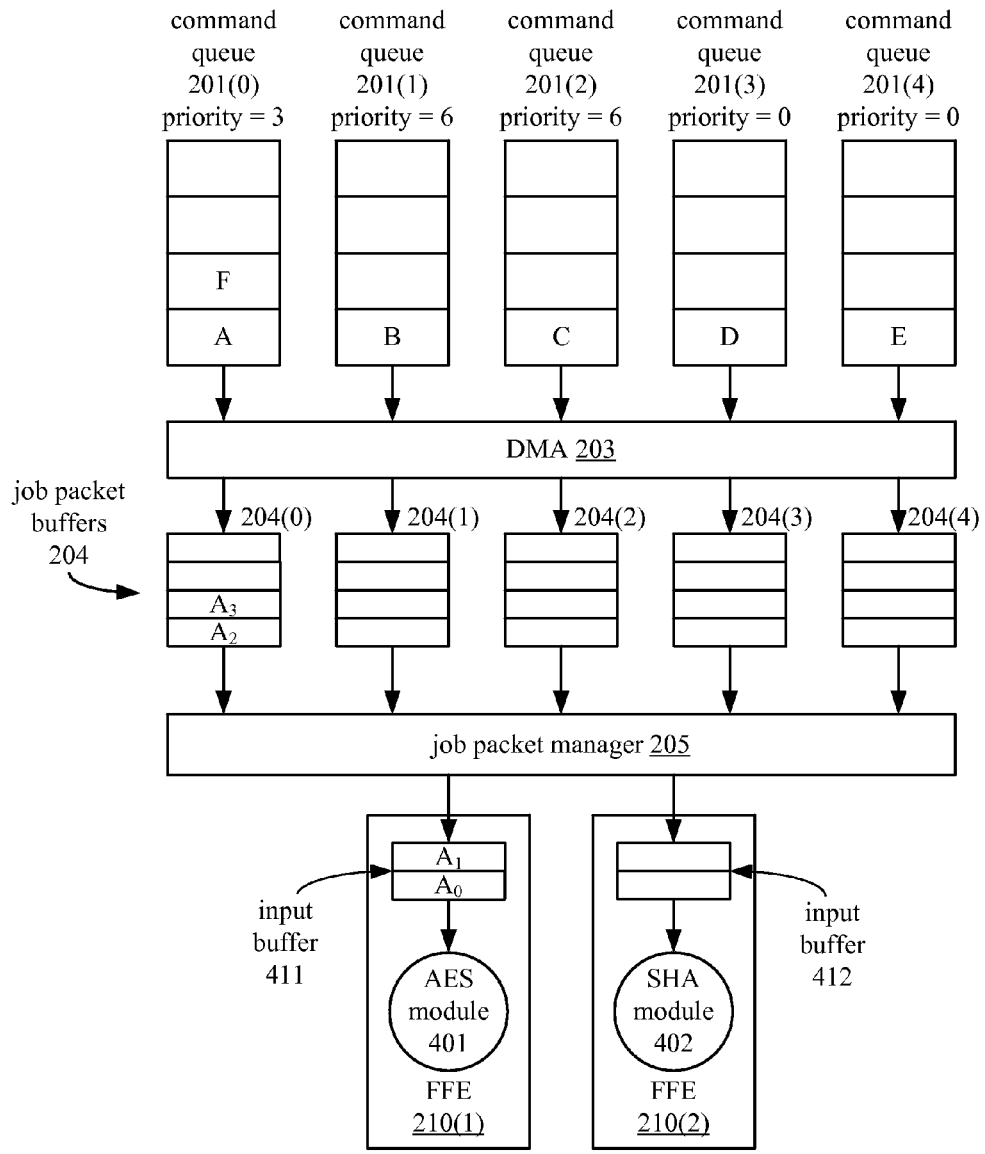

As illustrated in FIG. 7, since space is still available in the input buffer 411 for the AES FFE 210(1), the job packet manager 205 also queues $A_1$ to the input buffer 411 of FFE 210(1).

Figure 8:
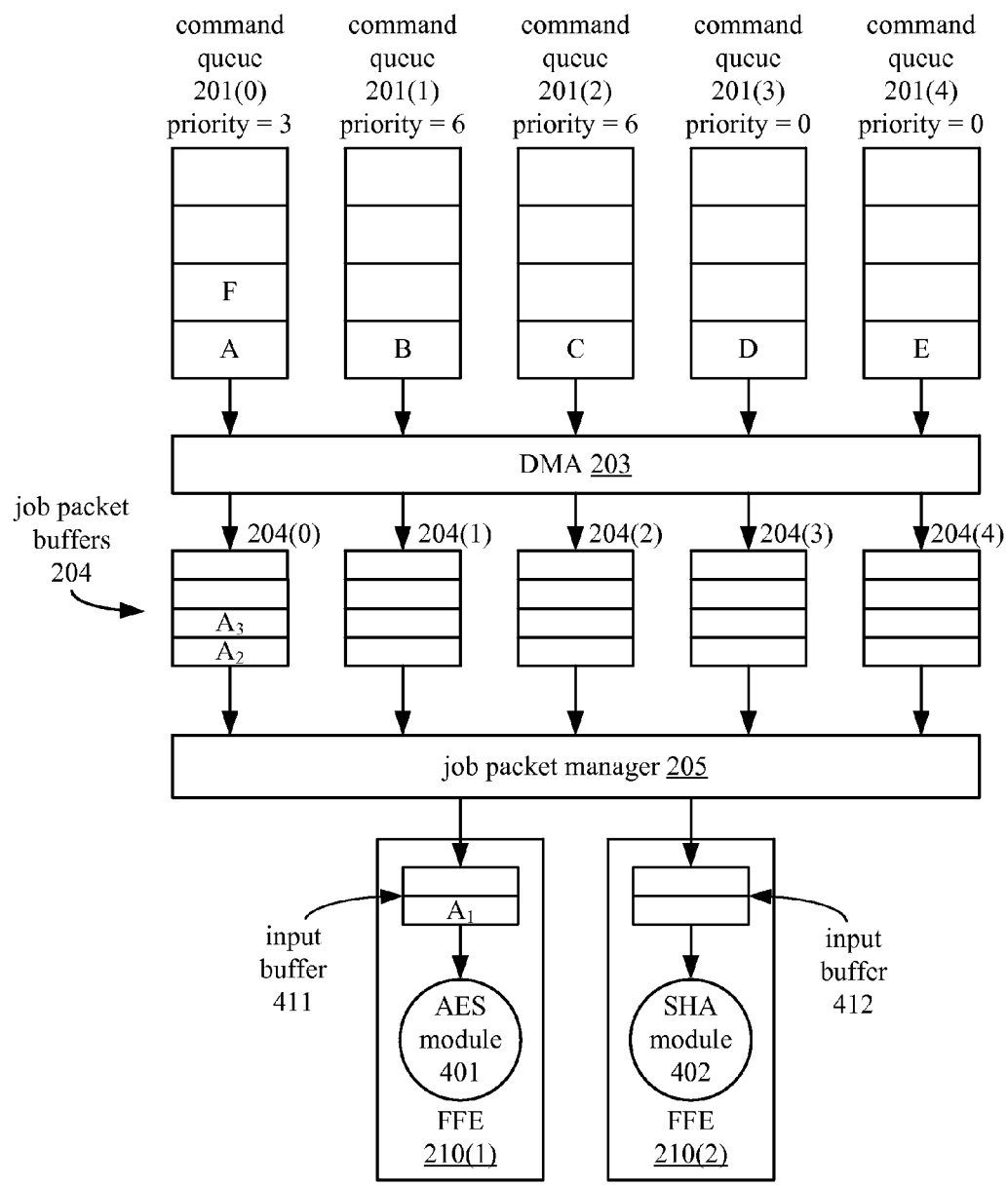

With reference to FIG. 8, as the AES module 401 begins processing $A_0$, space is made available in the input buffer 411, allowing the job packet manager 205 to initiate another arbitration cycle.

Figure 9:
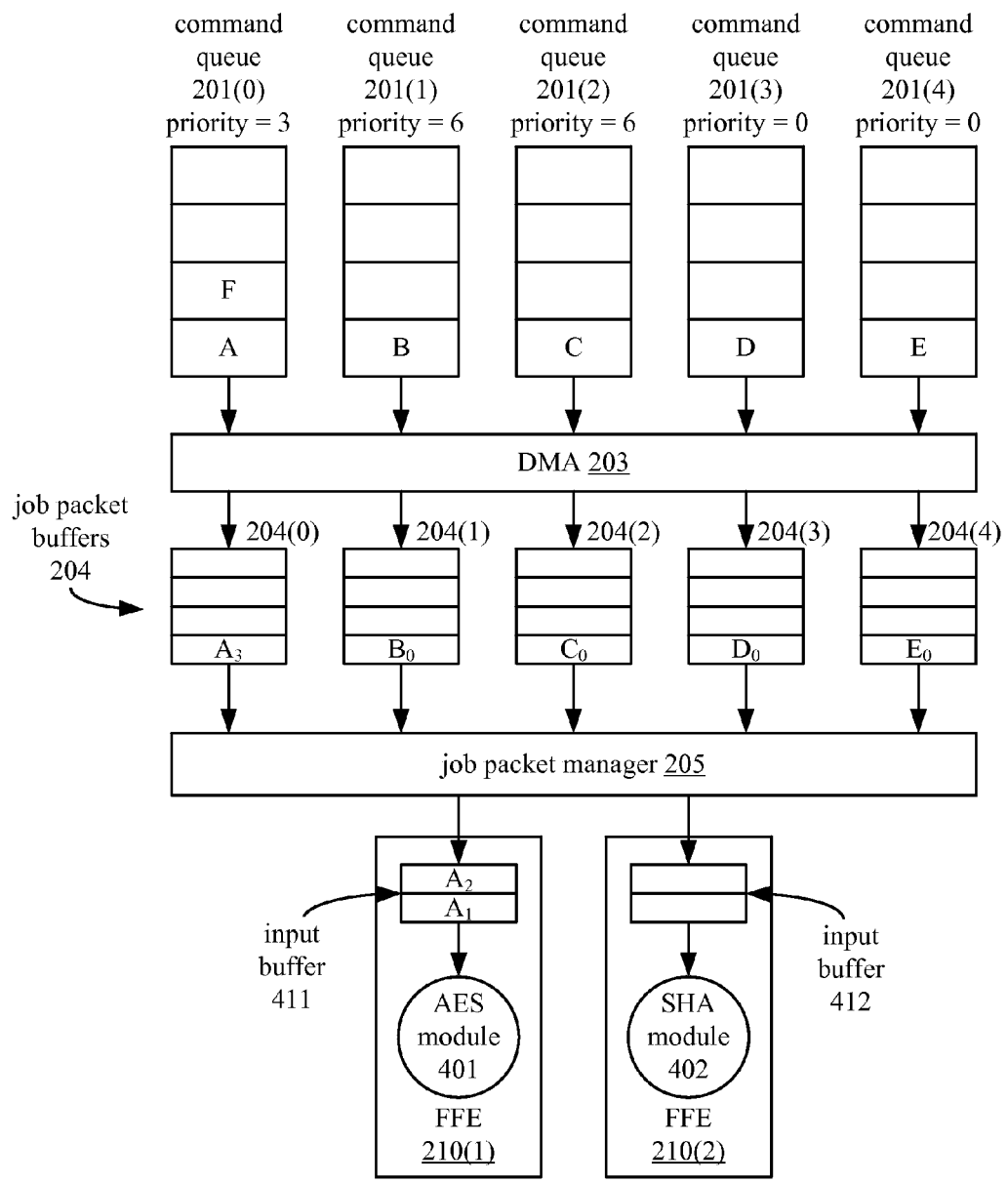

With reference to FIG. 9, since only command queue 201(0) has data available, the job packet manager 205 queues $A_2$ to the input buffer 411. As the DMA block 203 has fetched some data for command queues 201(1)-(4), commands B, C, D, and E are converted into job packets $B_0, C_0, D_0,$ and $E_0$, respectively. Job packets $B_0, C_0, D_0,$ and $E_0$ are queued in job packet buffers 204(1), 204(2), 204(3), and 204(4), respectively.

Figure 10:
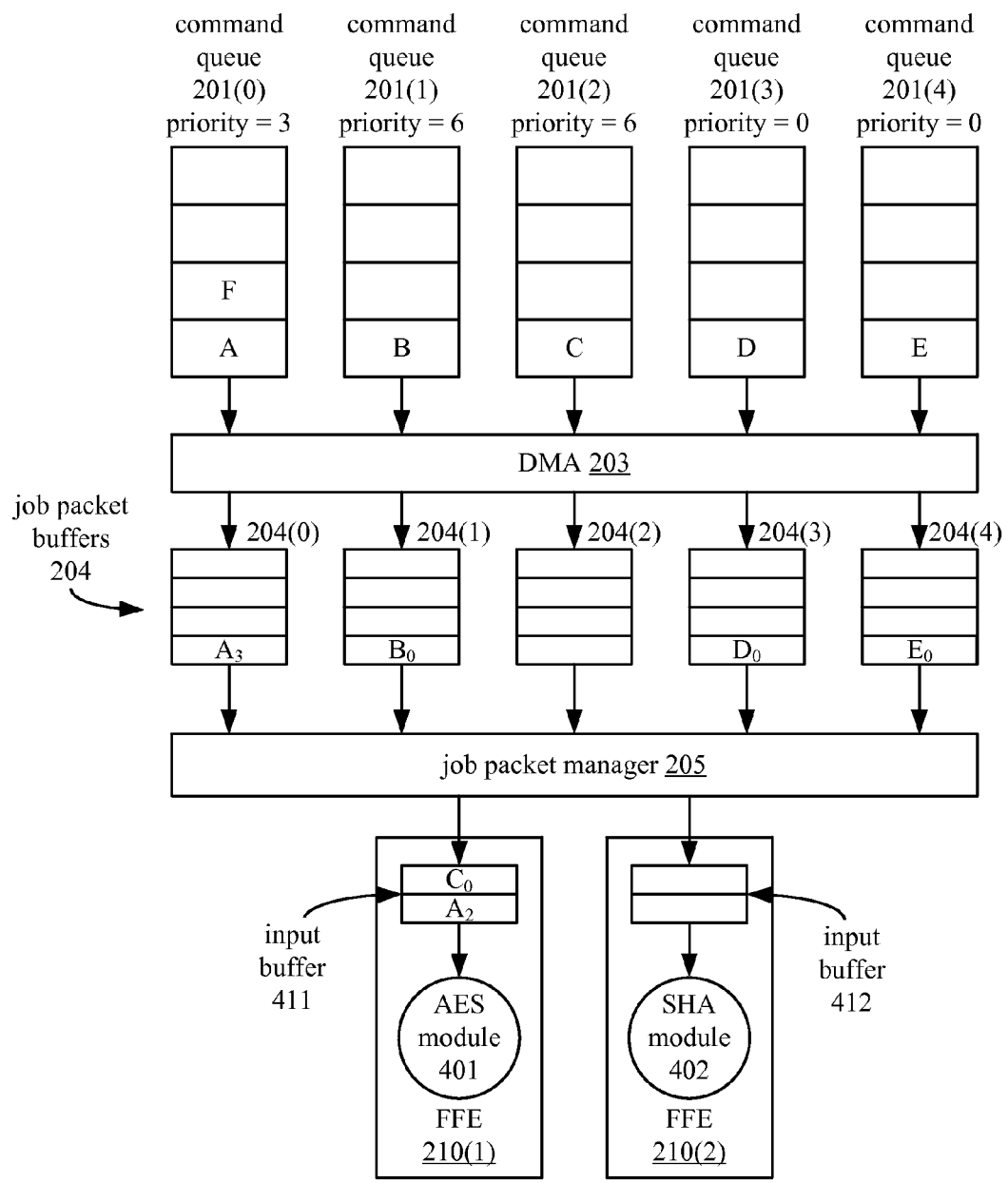
Figure 11:
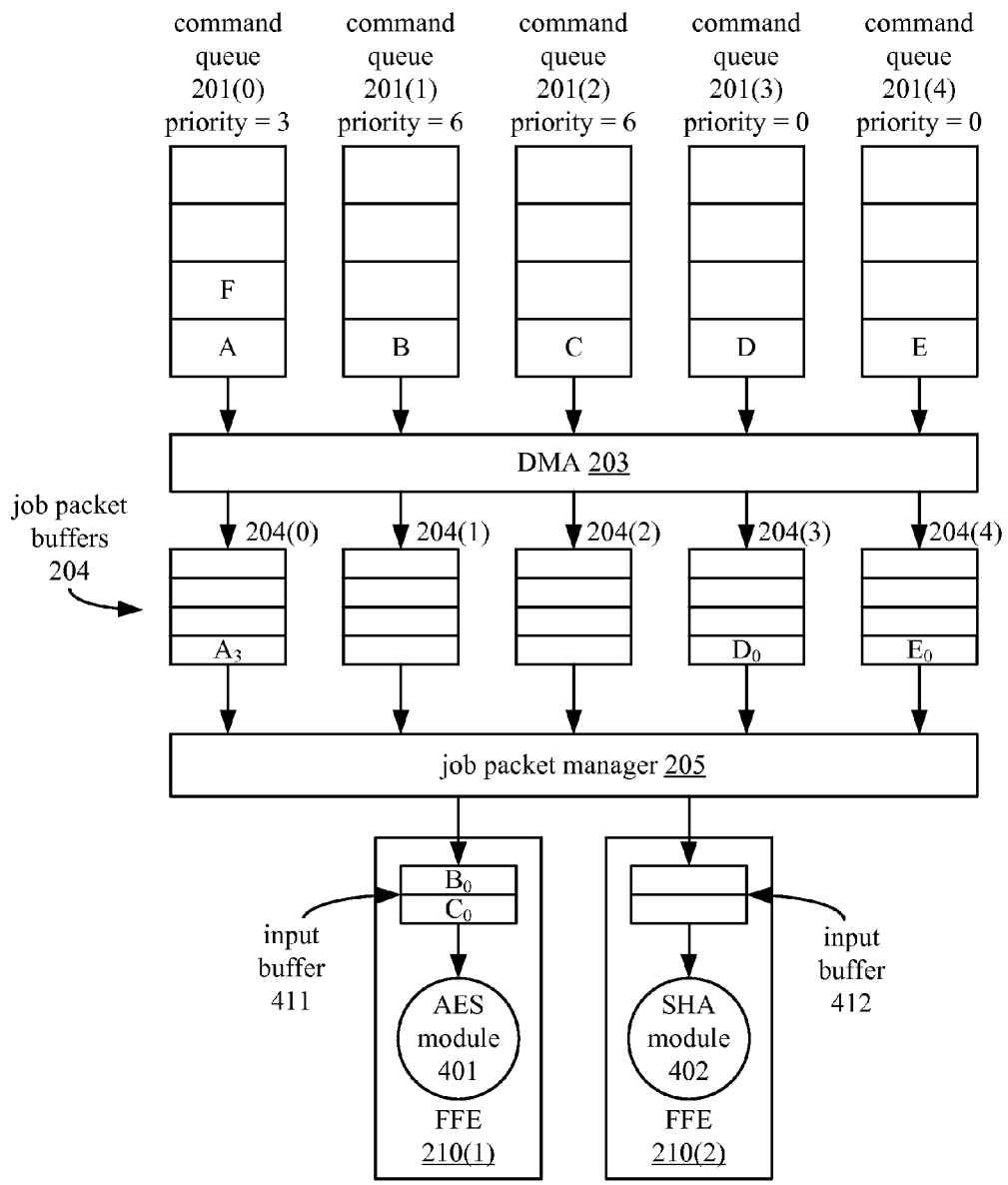

As illustrated in FIG. 10, while the AES engine process job packet $A_1$, the job packet manager 205 may begin another arbitration cycle, during which the job packet manager 205 may scan across the command queues 201 that have work for the AES FFE 210(1). $C_0$ is selected and queued to the input buffer 411 since it originated from one of the highest priority command queues 201(2), having a priority of 6. As illustrated in FIG. 11, when space becomes available in the input buffer 411, job packet $B_0$ is queued in buffer 411 since job packet $B_0$ originates from the highest priority command queue 201(1).

Figure 12:
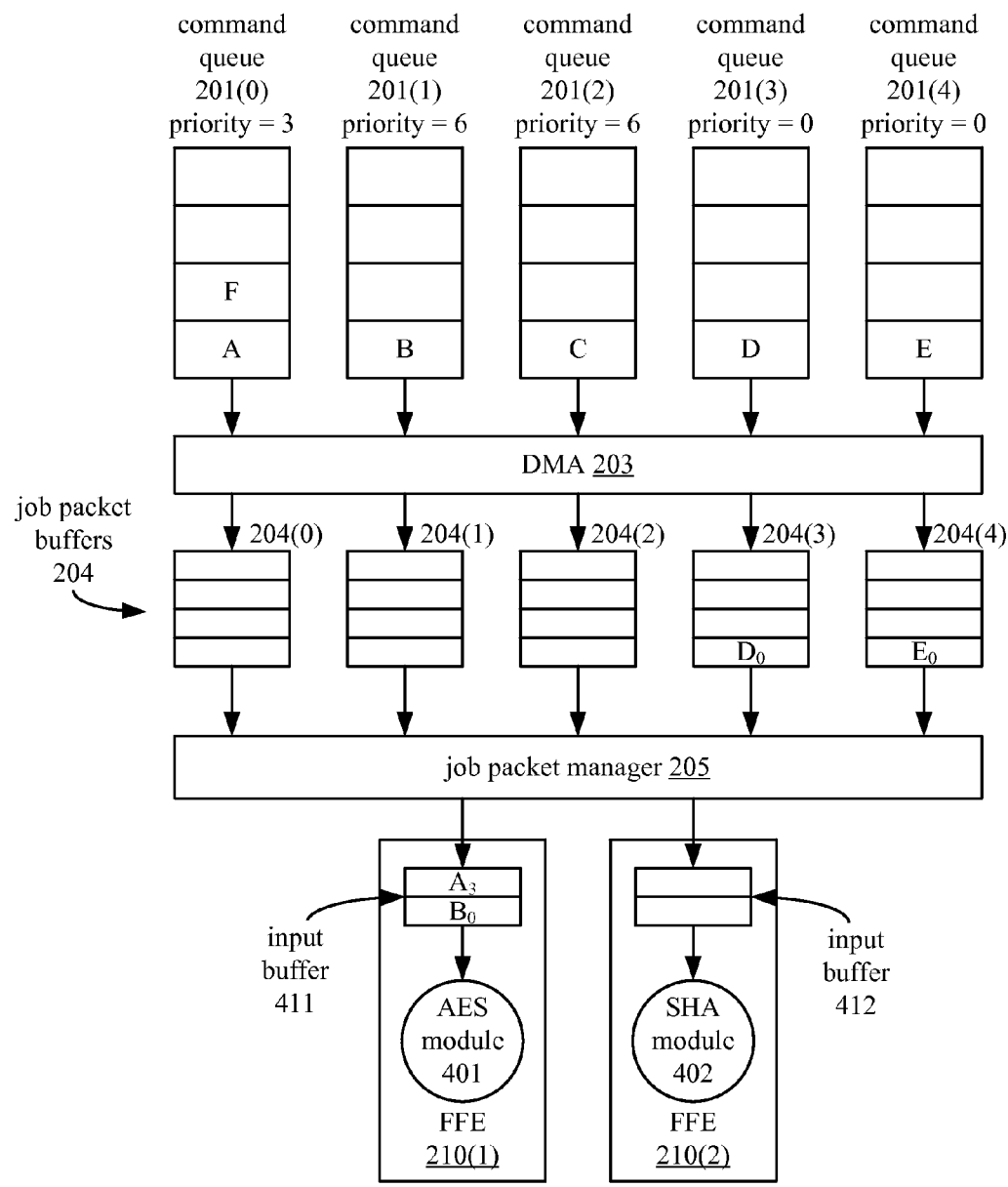

As illustrated in FIG. 12, as job packet $C_0$ is processed by the AES module 401, job packet $A_3$ is queued after job packet $B_0$ because job packet $A_3$ now has the highest priority among the remaining job packets.

Figure 13:
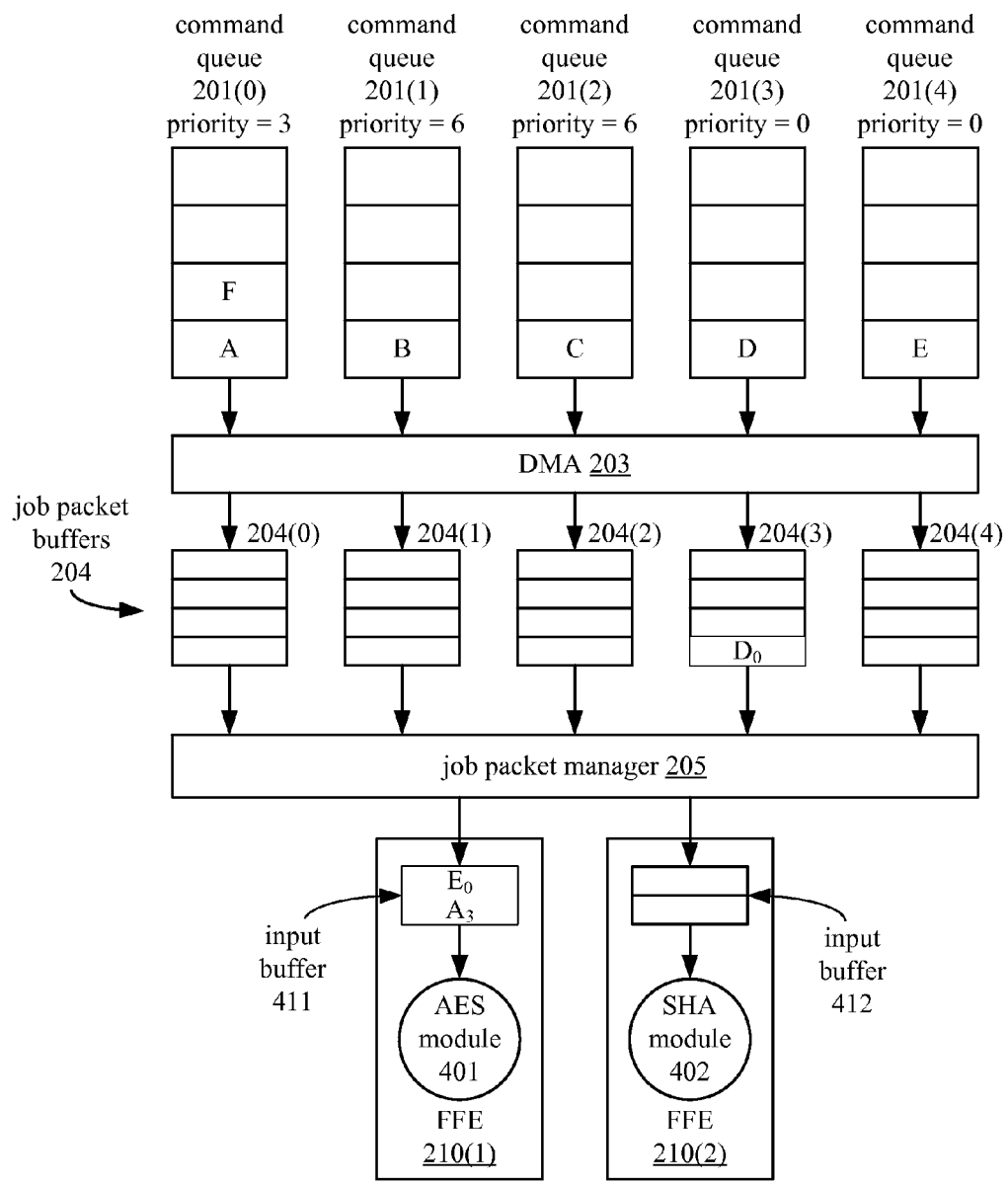

In one embodiment, the job packet manager 205 may arbitrate between job packets having the same priority by selecting the job packet from a higher numbered command queue. For example, as illustrated in FIG. 13, as job packet $B_0$ is processed by the AES module 401, job packet $E_0$ is added to the input buffer 411 because job packet $E_0$ has the same priority as job packet $D_0$, but comes from a higher numbered command queue. In an alternative embodiment, other criteria may be used for selecting one job packet before another when both job packets have the same priority.

Figure 14:
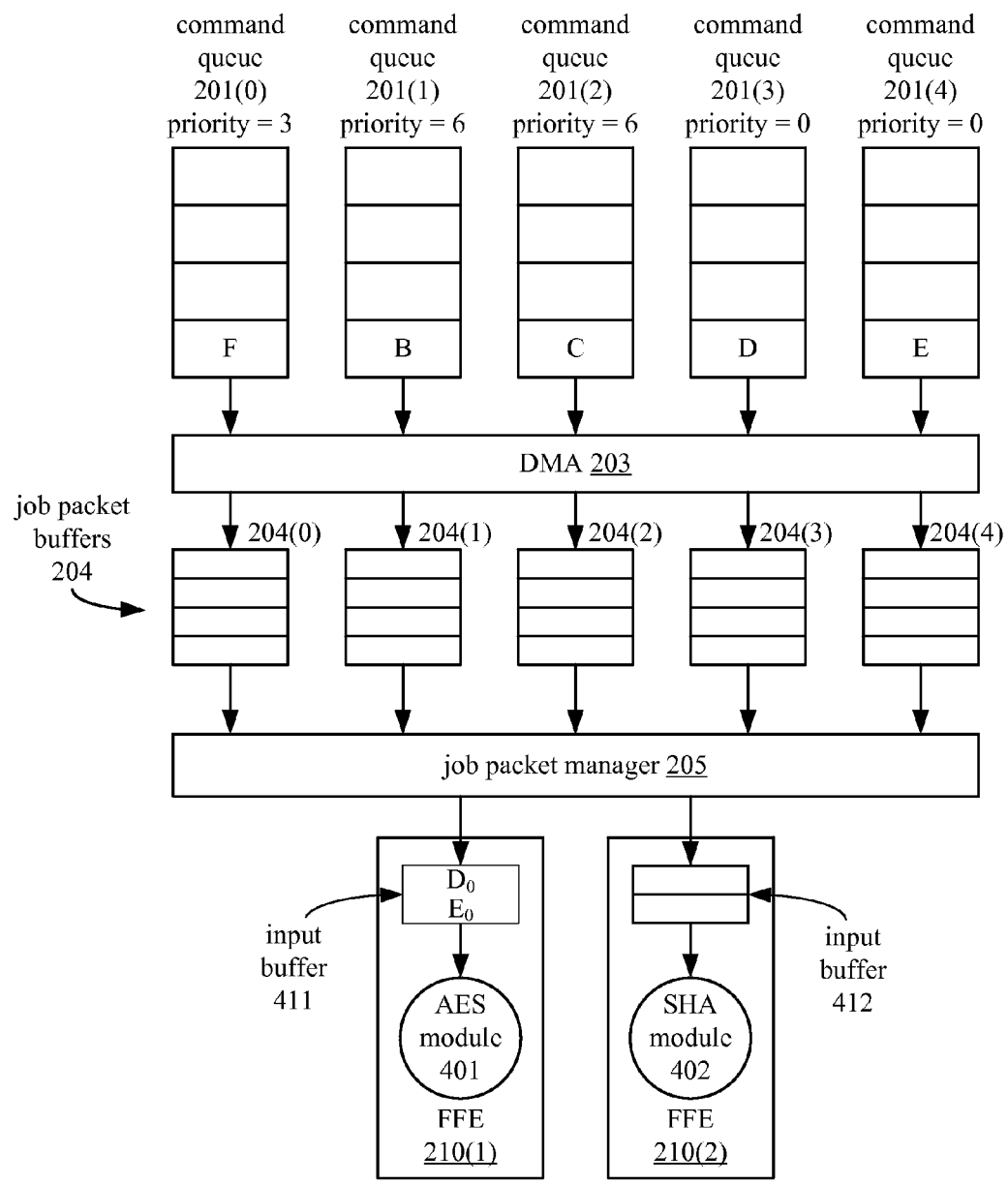

As illustrated in FIG. 14, job packet $D_0$ is queued in input buffer 411 when space is available in buffer 411, since job packet $D_0$ is the last remaining job packet. Command A is deleted from command queue 0 once the final job packet $A_3$ of command A has been processed. Command F becomes active and the DMA block 203 begins retrieving the workload data associated with command F.

Figure 15:
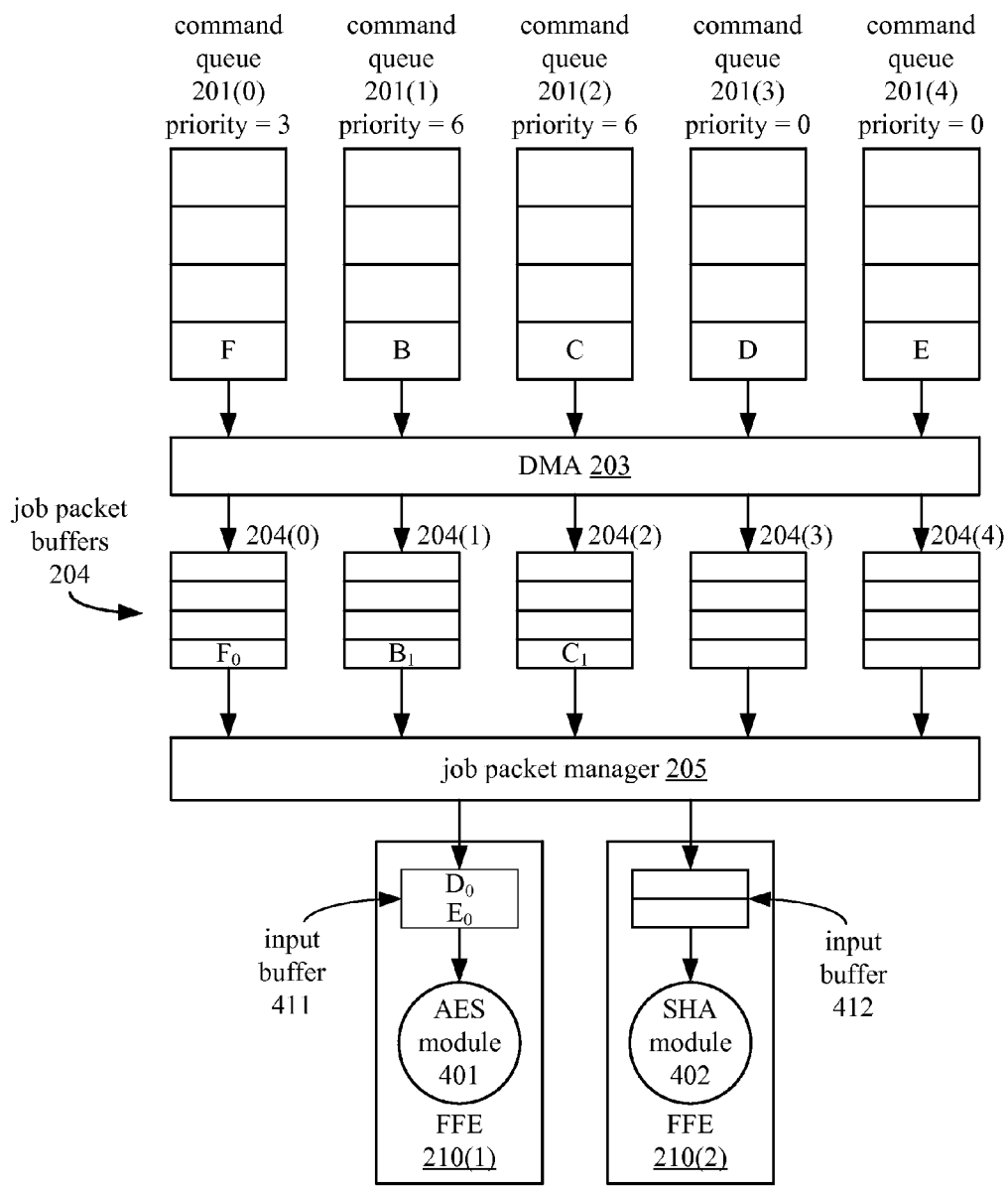

FIG. 15 illustrates a point at which the DMA block 203 has fetched the workload data for command F and generated a corresponding job packet $F_0$, as well as job packets $B_1$ and $C_1$, which include the remaining data for commands B and C, respectively.

Figure 16:
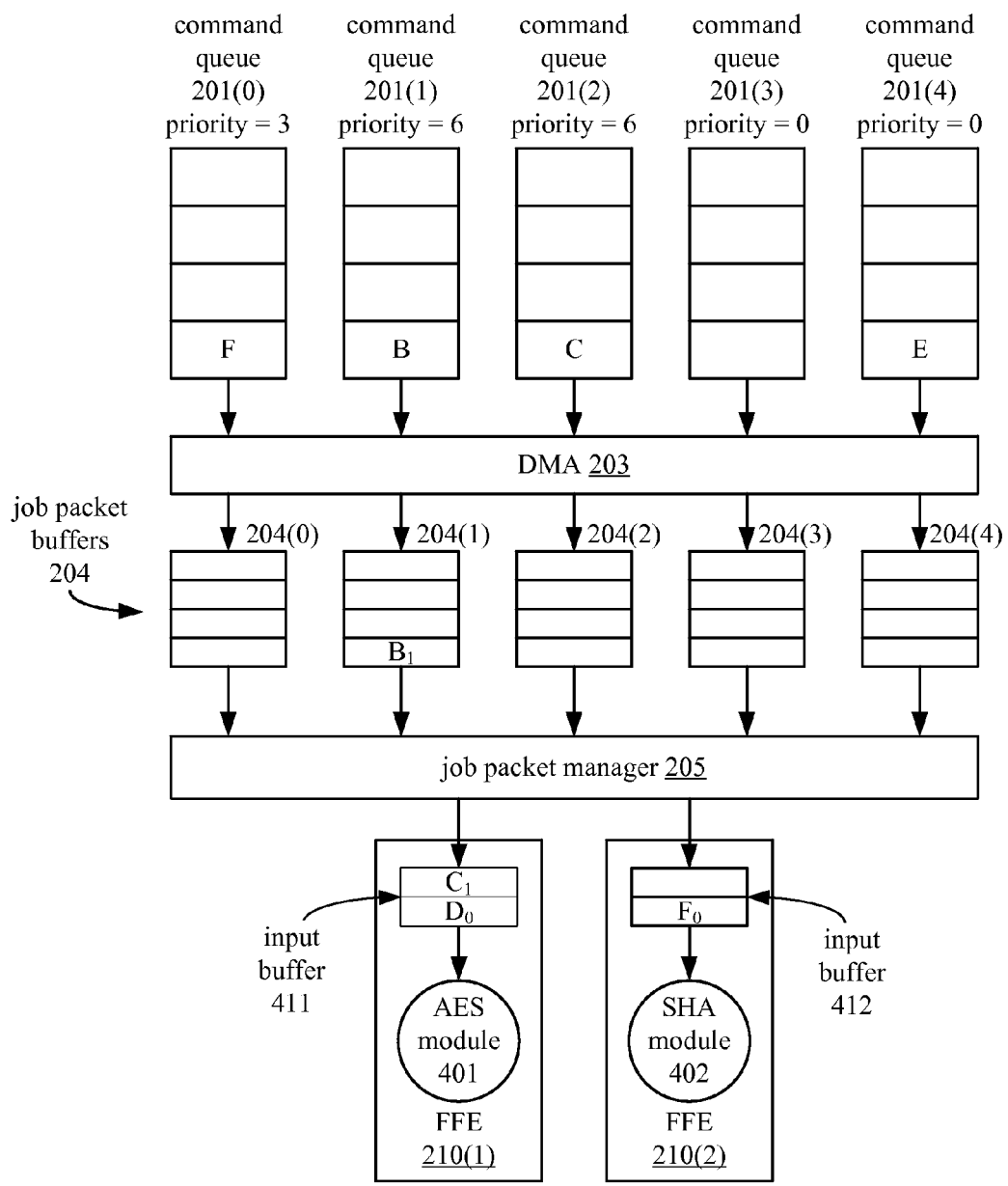

As illustrated in FIG. 16, the job packet manager 205 schedules job packet $F_0$ to the input buffer 412 of the SHA FFE 210(2), since space is available in buffer 412. Also, the job packet $E_0$ has been sent into the AES module 401 for processing, leaving free slot in the input buffer 411. Thus, the job packet manager 205 queues job packet $C_1$ in the free slot of input buffer 411. When another slot is available in the input buffer 411, the job packet manager 205 queues job packet $B_1$ for servicing by the AES FFE 210(1). Command F is deleted once the SHA module 402 of FFE 210(2) has finished processing the last job packet $F_0$ of command F.

Figure 17:
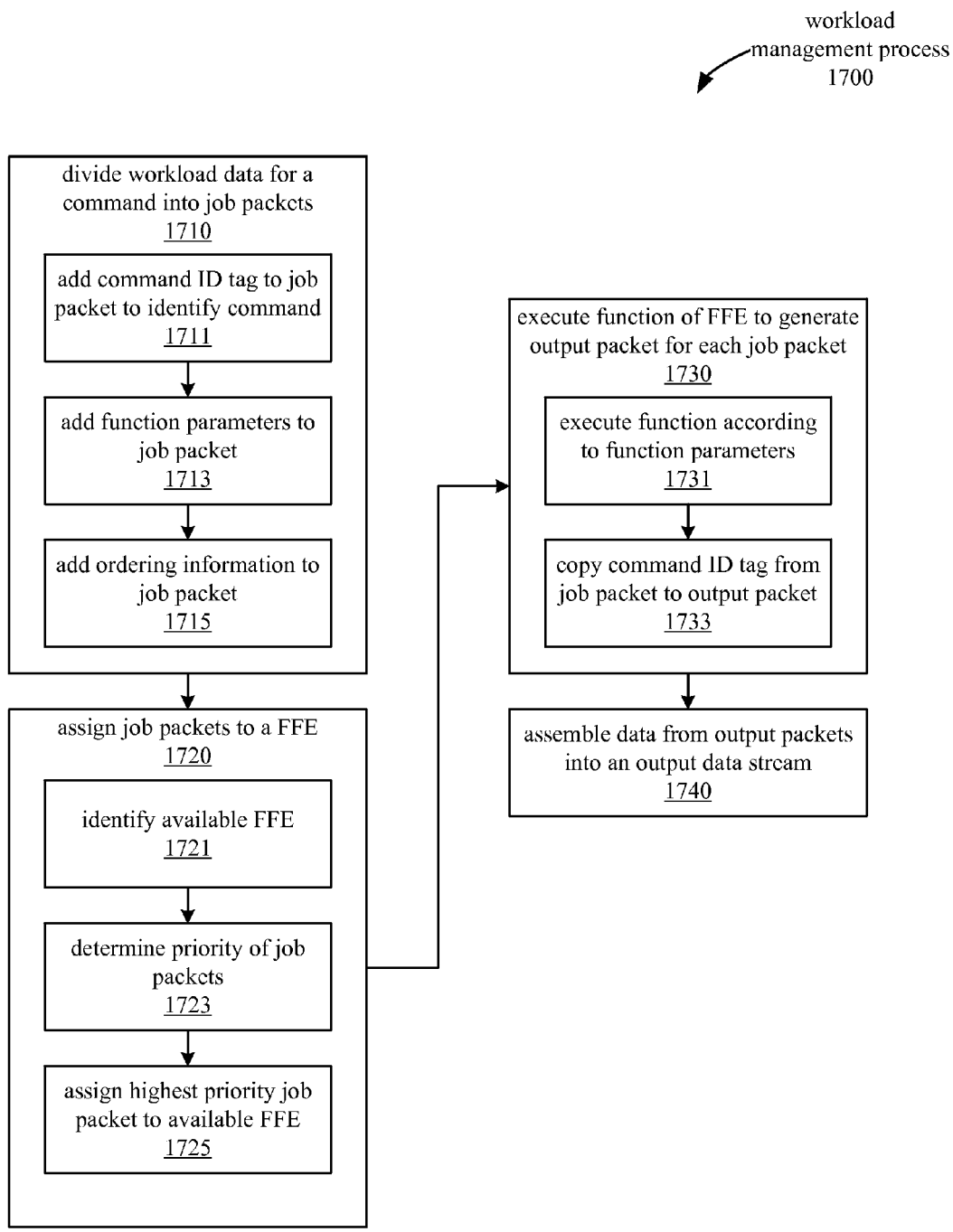
FIG. 17 is a flow diagram illustrating an embodiment of a workload management process.

FIG. 17 illustrates a workload management process 1700, according to an embodiment. In one embodiment, the process 1700 may be executed using a workload management architecture similar to architecture 200, as illustrated in FIG. 2.

Workload management process 1700 begins at block 1710. At block 1710, the DMA block 203 of architecture 200 divides workload data associated with a command into a plurality of job packets. In one embodiment, the DMA block 203 includes or has access to memory which stores information about how to format the job packets so they can be processed by the FFEs 210. In one embodiment, the DMA block 203 may divide the workload data for a plurality of commands into job packets; for example, the DMA block 203 may also divide the workload data for a second command into a second plurality of job packets.

In one embodiment, the operation 1710 of dividing the workload data into job packets may also include the operations of blocks 1711, 1713, and/or 1715. At block 1711, the DMA block 203 may add to each of the of job packets a command identification (ID) tag identifying a corresponding one of the commands from which the job packets were generated. In one embodiment, the command ID tag may be used to determine handling of the job packet; for example, the command ID tag may be used to look up priority information or to facilitate assembly of output packets into an output data stream.

At block 1713, the DMA block 203 may add one or more function parameters to the created job packets. These function parameters may include any information that affects the operation of the FFE that processes the job packet. For example, an FFE that performs AES operations may encrypt or decrypt the data in a job packet depending on a parameter indicating whether an encryption or decryption operation is to be performed, or an FFE that performs compression may receive a function parameter indicating the level or type of compression to be performed.

At block 1715, the DMA block 1715 may add ordering information to the job packets. Such ordering information may indicate, for example, the original order of the workload data contained in the job packets. The ordering information may be later used for assembling data from the output packets into the output data stream in the correct order. In one embodiment, the final order of the output data may be different from the order in which the input workload data was processed to generate the output data.

From block 1710, the process 1700 may continue at block 1720, where the job packet manager 205 assigns one or more of the job packets to a fixed function engine (FFE). In one embodiment, the operations of block 1720 may include the operations of blocks 1721, 1723, and/or 1725. At block 1721, the job packet manager 205 may identify an available FFE. In one embodiment, an available FFE may be an FFE that includes an input buffer with available space. At block 1723, the job packet manager 205 may determine a priority of each of the job packets that is ready for assigning to an FFE. For example, the job packet manager 205 may determine the priority of a job packet by identifying a priority associated with the command queue from which the job packet originated. From block 1723, the process 1700 may continue at block 1725.

At block 1725, the job packet manager 205 may assign the job packet having the highest priority to the available FFE identified at block 1721; thus, the highest priority job packet is assigned to the available FFE prior to the assignment of a job packet having less than the highest priority to the FFE.

In one embodiment, the job packet manager 205 may similarly assign one or more job packets from the same or different commands to multiple FFEs, including a second FFE, for example. From block 1720, the process 1700 continues at block 1730.

At block 1730, the workload management architecture 200 may initiate the execution of a function of the FFE at which the job packet was queued. For example, the architecture 200 may cause the FFE to perform a function such as compression, encryption, or some other process on the data in the job packet. For an FFE configured to perform encryption, the FFE may perform encryption of the data in the job packet. An FFE configured to perform compression may compress the data in the job packet. In one embodiment, the architecture 200 may include more than one FFE capable of operating simultaneously. For example, the architecture 200 may execute a function of a second FFE to generate a second set of output packets concurrently with execution of a function of the first FFE. In one embodiment, the function performed by the first FFE may be different from the function performed by the second FFE.

In one embodiment, the multiple FFEs may operate independently and may complete processing of job packets according to different time frames. For example, one of the FFEs may take more or less time to process a job packet than another of the FFEs.

In one embodiment, the operations of block 1730 may include blocks 1731 and/or 1733. At block 1731, an FFE processing a job packet may retrieve one or more function parameters from the job packet, then execute the function according to the one or more function parameters. In one embodiment, the function parameters may be the function parameters added to the job packet at block 1713.

At block 1733, for each of the job packets processed by the FFE that includes a command ID tag, the FFE may copy the command ID tag to a corresponding output packet generated by the FFE. From block 1730, the process 1700 continues at block 1740.

At block 1740, the architecture 200 may assemble data from the one or more output packets into an output data stream. In one embodiment, the assembly of the output data may be performed by the DMA block 203, which may use switch 208 to select the appropriate output packet buffers 207 to retrieve the output packets in the correct order. In an alternative embodiment, DMA block 203 may instead retrieve the output packets from the buffers 207 in a predetermined sequence and subsequently reorder the data in the output packets. In one embodiment, the output packets may be generated by the FFEs 210 in an initial order that is different from the final order of the data in the output data stream. In one embodiment, the output data stream may be written by the DMA block 203 to an output file via memory interface 202.

The embodiments described herein may include various operations. These operations may be performed by hardware components, software, firmware, or a combination thereof. As used herein, the terms "coupled to" or "coupled with" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the workload management architecture 200 and/or portions thereof carried on the computer-readable storage medium may be a database or other data structure which can be read by a program and used, directly or indirectly, to fabricate the hardware comprising the workload management architecture 200. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the workload management architecture 200. The netlist may then be placed and routed to produce a data set describing geometric shapes to be applied to masks. The masks may then be used in various semiconductor fabrication steps to produce a semiconductor circuit or circuits corresponding to the workload management architecture 200. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader spirit and scope of the embodiments as set forth in the appended claims. The specification and drawings are, accordingly, to be regarded in an illustrative sense rather than a restrictive sense.

What is claimed is:

1. An apparatus, comprising:
   an input configured to receive workload data for a plurality of commands;
   a DMA block coupled with the input, wherein the DMA block is configured to divide the workload data for each command of the plurality of commands into a plurality of job packets;
   a job packet manager coupled with the DMA block, wherein the job packet manager is configured to assign one of the job packets to one of a plurality of fixed function engines (FFEs) coupled with the job packet manager; and
   the plurality of FFEs, wherein each of the plurality of FFEs is configured to receive one or more of the job packets and generate one or more output packets based on the workload data in the received one or more job packets.

2. The apparatus of claim 1, wherein the DMA block, the job packet manager, and the plurality of FFEs are constructed on the same semiconductor substrate.

3. The apparatus of claim 1, further comprising a plurality of input first-in-first-out (FIFO) buffers, wherein each FIFO buffer of the plurality of FIFO buffers is configured to queue assigned job packets for a different FFE of the plurality of FFEs.

4. The apparatus of claim 1, further comprising a plurality of output buffers, wherein each output buffer of the plurality of output buffers is configured to receive output packets generated by a different FFE, and wherein the DMA block is further configured to reassemble output data from the output packets into an output data stream according to an order indicated by at least one of the received output packets.

5. The apparatus of claim 1, wherein the DMA block is further configured to add to each of the plurality of job packets a tag identifying a corresponding one of the plurality of commands, and wherein each of the plurality of FFEs is configured to copy the tag from each of the one or more received job packets to a corresponding output packet.

6. The apparatus of claim 1, wherein the job packet manager comprises a switchable interconnect coupled with the DMA block and each of the plurality of FFEs, wherein the switchable interconnect is configured to transfer the assigned job packets to the plurality of FFEs.

7. The apparatus of claim 1, wherein a first time duration for processing a first job packet by a first FFE of the plurality of FFEs is less than a second time duration for processing a second job packet by a second FFE of the plurality of FFEs.

8. The apparatus of claim 1, wherein a first FFE of the plurality of FFEs is configured to perform a first set of calculations, and wherein a second FFE of the plurality of FFEs is configured to perform a second set of calculations different from the first set of calculations.

9. A method, comprising:
dividing workload data associated with a command into a plurality of job packets;
assigning one or more of the plurality of job packets to a first fixed function engine (FFE);
executing a function of the first FFE to generate a first set of one or more output packets including an output packet for each of the one or more assigned job packets; and
assembling output data from the one or more output packets into an output data stream.

10. The method of claim 9, further comprising:
adding to each of the plurality of job packets a tag identifying a corresponding one of the plurality of commands; and
for each of the plurality of job packets, copying the tag to a corresponding output packet.

11. The method of claim 9, further comprising adding one or more function parameters to one or more of the plurality of job packets, wherein executing the function of the first FFE comprises executing the function according to the one or more function parameters.

12. The method of claim 9, wherein assigning one or more of the plurality of job packets to the first FFE further comprises:
determining a priority of each of the plurality of job packets; and
assigning a job packet having the highest priority to the first FFE prior to assigning a job packet having less than the highest priority to the first FFE.

13. The method of claim 9, further comprising:
dividing workload data associated with a second command into a second plurality of job packets;
assigning one or more of the second plurality of job packets to a second FFE; and
executing a function of the second FFE to generate a second set of one or more output packets, wherein the function of the first FFE is different from the function of the second FFE.

14. The method of claim 9, wherein the function of the first FFE is an encryption function, and wherein generating the first set of one or more output packets comprises encrypting input data from the one or more assigned job packets.

15. The method of claim 9, further comprising adding ordering information to the plurality of job packets, wherein assembling the one or more output packets into the output data stream comprises ordering the one or more output packets according to the ordering information.

16. The method of claim 9, wherein the one or more output packets comprises a plurality of output packets generated in an initial order, and wherein assembling the one or more output packets into the output data stream comprises ordering output data from the plurality of output packets according to a final order different from the initial order.

17. A computer system, comprising:
a processor;
a memory coupled with the processor, wherein the memory comprises instructions that, when executed by the processor, cause the computer system to perform a method comprising:
dividing workload data associated with a command into a plurality of job packets;
assigning one or more of the plurality of job packets to a fixed function engine (FFE);
executing a function of the FFE to generate one or more output packets including an output packet for each of the one or more assigned job packets; and
assembling output data from the one or more output packets into an output data stream.

18. The computer system of claim 17, wherein the FFE is one of a plurality of FFEs located within a coprocessor coupled with the processor.

19. The computer system of claim 17, wherein the method further comprises adding ordering information to the plurality of job packets, and wherein assembling the plurality of output packets into the output data stream comprises ordering output data from the output packets according to the ordering information.

20. The computer system of claim 17, wherein the method further comprises:
adding to each of the plurality of job packets a tag identifying a corresponding one of the plurality of commands; and
for each of the plurality of job packets, copying the tag to a corresponding output packet.

* * * * *